United States Patent
Suzuki

(10) Patent No.: US 7,483,176 B2
(45) Date of Patent: Jan. 27, 2009

(54) IMAGE PROCESSING APPARATUS AND METHOD

(75) Inventor: Takayuki Suzuki, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1083 days.

(21) Appl. No.: 10/794,534

(22) Filed: Mar. 5, 2004

(65) Prior Publication Data

US 2004/0257623 A1 Dec. 23, 2004

(30) Foreign Application Priority Data

Jun. 23, 2003 (JP) ............................. 2003-177530

(51) Int. Cl.
H04N 1/40 (2006.01)
H04N 1/393 (2006.01)
G06F 15/00 (2006.01)

(52) U.S. Cl. ...................... 358/3.03; 358/1.2; 358/448; 358/451

(58) Field of Classification Search ................. 358/448, 358/474, 450, 451, 452, 453, 462, 463, 464, 358/465, 466, 473, 478, 3.03, 1.2; 345/604, 345/581, 418
See application file for complete search history.

(56) References Cited

U.S. PATENT DOCUMENTS

| | | | | |
|---|---|---|---|---|
| 5,051,841 A | * | 9/1991 | Bowers et al. | 358/463 |
| 5,130,823 A | * | 7/1992 | Bowers | 358/465 |
| 5,309,254 A | * | 5/1994 | Kuwabara et al. | 358/462 |
| 5,515,456 A | * | 5/1996 | Ballard | 358/3.03 |
| 5,838,333 A | * | 11/1998 | Matsuo | 345/604 |
| 5,995,986 A | * | 11/1999 | Ueda et al. | 345/581 |
| 6,008,812 A | * | 12/1999 | Ueda et al. | 345/418 |
| 6,134,355 A | * | 10/2000 | Yamada et al. | 358/3.03 |
| 6,175,424 B1 | * | 1/2001 | Iino et al. | 358/3.03 |

FOREIGN PATENT DOCUMENTS

| | | |
|---|---|---|
| JP | 63309455 | 12/1988 |
| JP | 09284543 | 10/1997 |
| JP | 10-334231 | * 12/1998 |
| JP | 11017945 | 1/1999 |
| JP | 2002077612 | 3/2002 |

OTHER PUBLICATIONS

English translation of JP-10-334231.*
Publication No. JP 2000-158714, Jun. 13, 2000, Masahiro et al & English Abstract thereof.
Publication No. JP 2002-237952, Aug. 23, 2002, W. Toru & English Abstract thereof.

* cited by examiner

Primary Examiner—Houshang Safaipour
(74) Attorney, Agent, or Firm—Lucas & Mercanti, LLP

(57) ABSTRACT

In order to reduce time required to perform error diffusion processing on one line of image data, one line of multi-tone image data 100 is divided into two or more segments of image data 102 and 103 with an overlapped region 101 provided across the boundary. The two or more segments of image data 102 and 103 are subjected to error diffusion to create binary image data 104 and 105 corresponding to the divided image data 102 and 103, respectively. Then the binary image data 104 and 105 are merged to form binary data 106 corresponding to the original image data of one line. Upon merging the binary image data, binary data b2 obtained from the divided image data 102 located upstream of the line before divided in the direction in which the error diffusion processing progresses is used as binary data corresponding to the overlapped region.

8 Claims, 8 Drawing Sheets

IMAGE PROCESSING APPARATUS AND METHOD

BACKGROUND OF THE INVENTION

1. Field of the Invention

The present invention relates to an image processing apparatus and method for performing error diffusion processing to convert multi-tone image data to binary image data capable of representing intermediate gradation.

2. Description of Prior Arts

A copier or scanner has an scanning unit with a photoelectric device like a CCD (Charge Coupled Device) in which light is emitted to an original so that the CCD will receive the reflected light from the original and convert the radiant energy of light to an analog electrical signal corresponding to the intensity of the light. Then, the analog electrical signal is subjected to A/D conversion so that a digital electric signal corresponding to the original image will be outputted. For example, if the output digital electrical signal represents 10 bits per pixel, it will mean that the copier or scanner provides monochroic gradation of 1024 levels for each pixel.

In general, the digital electrical signal is subjected to various processing, such as correction of sensitivity variations in the photoelectric device, luminance-density conversion, MTF correction, and noise elimination and so on, and converted to 8-bit image data that represents each pixel with image of gradation of 256 levels. The multi-tone image data are then binarized by error diffusion, that is, it is converted to binary image data that represents each pixel by one bit deep (either black or white) so that the binary image data will be used as image data to be sent to a printer unit or facsimile unit.

In conversion of multi-tone image data to binary image data with gradation of two levels (normally black and white), density of each pixel is compared with a predetermined threshold value. When the density is higher than the threshold value, the pixel is represented as black, while the density is lower than the threshold value, the pixel is represented as white. If the density of 256-level image data is "200" and the threshold value is "128," the pixel is determined as black. In such a simple binarization technique, all pixels with density values ranging from "0" to "127" are converted to black and other pixels with density values of "128" to "255" are converted to white, resulting in loss of gradation of the original image data.

To cope with this problem, there have been proposed error diffusion methods as binarization methods which can give gradation or appearance of gray levels or halftones by means of plural pixels when viewed at a distance even though each pixel is represented with one bit deep, either black or white. The error diffusion methods are basically intended to preserve gradation of the original information by distributing the error or difference between the density of a binarized pixel (black or white) and its original density to neighboring, unprocessed pixels. For example as shown in FIG. 17, if multi-tone image data represented in 256 levels of pixel density ranging from "0" to "255" is binarized with a threshold level of "128", pixel 901 having a density of "255"is originally a black pixel and therefore an error is "0". Pixel 902 having a density of "126" exhibits a difference 912 of "126" from the density level of 255, that is, from the density of completely black, and pixel 903 having a density of "200" exhibits a difference 913 of "55" from the density of completely black.

In the error diffusion process, the error produced in the binarization process is carried over and distributed to neighboring, unprocessed pixels. Taking the pixel 903 having a density level of "200" as an example, the pixel is a little bit whitish gray (density 200) in comparison with complete black (density 255) after being binalized, so that the information indicating that it is a little bit more whitish than complete black (an error of −55 between density 200 and density 255) is distributed to neighboring, unprocessed pixels.

In the error diffusion process, since the error in density produced upon binarization of a pixel being processed is carried over and distributed to neighboring, unprocessed pixels, it is necessary to process the image data in a given direction, for example, from the beginning to the end of a page, or from the beginning to the end of a line.

Japanese Patent Laid-Open No. 2000-158714 discloses an image processing apparatus in which error diffusion is appropriately applied to a long-length image to be printed across two or more pages under such a limitation. In this apparatus, the error diffusion process is applied to every new page while attending to errors produced on previous pages by not initializing between pages error data buffer storing errors produced when binalizing.

Japanese Patent Laid-Open No. 2002-237952 as another example of prior art discloses. In a technique in which a page is divided into multiple bands to perform error diffusion while managing an error buffer on a band basis, thereby reducing the necessary memory capacity size without degrading image quality at banding joints.

When a scanner or the like scans image data line by line, if time required to perform error diffusion on one line of multi-tone image data is shorter than one-line scanning time of the scanner, real-time error diffusion can be performed in step with the scanning speed of the scanner.

However, as a number of pixels per line increases, such as a case of scaling up while scanning, the error diffusion process may not be able to keep up with the scanning cycle. In such a case, one page of multi-tone image data needs to be stored in a page memory)prior to performing the error diffusion process. For example, scanning an A4 image at 600 dpi requires a memory size of about 32 Mbytes. Further, since the error diffusion process can start only after the multi-tone image data has been completely stored in the one-page memory, it takes much time to create binary image data, and hence delays subsequent processing.

SUMMARY OF THE INVENTION

The present invention has been made in view of the problems of the conventional techniques, and it is an object thereof to provide an image processing apparatus and method capable of reducing time required to perform error diffusion on one line of image data.

In attaining the above object, the summary of the present invention is described below.

In one aspect of the present invention, there is provided an image processing apparatus for scanning an original line by line and performing image processing on image data on the scanned original, the image processing apparatus comprising: scanning means for scanning the original line by line; dividing means for dividing one line of image data scanned by the scanning means into two or more segments of image data; image processing means for performing image processing on the two or more segments of image data divided by the dividing means; and image merging means for merging the two or more segments of image data processed by the image processing means into the same layout as the original, wherein the image processing means performs image processing on the two or mote segments of image data in parallel.

In the second aspect of the present invention, there is provided an image processing apparatus for binarizing multi-tone image data by error diffusion, the image processing apparatus comprising: error-diffusion executing means (31, 32, 33, 36, and 38) for dividing one line of multi-tone image data into two or more segments of image data with an overlapped region of the two or more segments of image data provided across the boundary, performing error diffusion on the respective segments of image data in the same direction along the line before divided, and outputting binary image data subjected to the error diffusion process; and image data merging means (40) for merging two or more segments of binary data outputted from the error-diffusion executing means (31, 32, 33, 36, and 38) by using, as binary image data corresponding to the overlapped region, binary image data obtained from the divided image data located upstream of the line before divided in the direction in which the error diffusion processing progresses, to create binary image data corresponding to one line of image data before divided.

According to the above invention, one line of multi-tone image data is divided into two or more segments of image data, subjected to error diffusion process to obtain binary data. The binary data thus obtained are merged to create binary image data corresponding to one line before divided. Further, upon dividing the multi-tone image data, an overlapped region of the image data is provided across the boundary, and upon merging the binary image data, the binary data created from the divided image data located upstream of the line before divided in the direction in which the error diffusion processing progresses is used as binary data corresponding to the overlapped region.

An error produced by the binarization of a pixel being processed (hereinafter called a processed pixel), that is, the difference or error between the density of the original pixel and the density of the pixel after the binarization process is distributed to neighboring, unprocessed pixels according to predetermined distribution factors. For example, when each pixel is represented by 8 bits as one of 256 levels of gray, if one-fourth of an error is distributed to the next pixel, the error that has occurred in the processed pixel will not be distributed to the fifth and further pixels because of the occurrence of a bit-dropout. Therefore, the number of pixels in the overlapped region is set to a value that is more than enough to absorb the influence of the error occurring in the processed pixel so that, even when the error diffusion processing starts from the first pixel of the overlapped region, the same binary image data when the error diffusion processing starts from the beginning of the line before divided can be obtained on the downstream side of the overlapped region in the direction in which the processing progresses.

Consequently, two or more segments of binary data obtained from the respective segments of image data are merged by using, as binary image data corresponding to the overlapped region, binary image data obtained from the divided image data located upstream of the line before divided in the direction in which the error diffusion processing progresses, thereby acquiring the same binary image data when the error diffusion processing is performed without dividing the line. Then, if the error diffusion processing is performed on the respective segments of image data in parallel, processing time per line can be reduced.

Note that one line of image data may be divided in a memory into two or more segments of image data so that the two or more segments of image data will be processed on the memory. In this case, for example, one line of multi-tone image data may be continuously stored in the memory so that the image data will be read out of the memory with an overlapped portion by setting the start address and end address of the error diffusion process.

In this aspect of the present invention, the error-diffusion executing means (31, 32, 33, 36, and 38) may perform the error diffusion processing on the two or more segments of image data in parallel.

According to the above invention, the error diffusion processing is performed on the two or more segments of image data in parallel. It can reduce time required to perform error diffusion on one line of image data.

Further, in this aspect of the present invention, among other distribution factors by which an error between the density of a pixel being binarized and the density of the pixel after the binarization process is distributed to neighboring pixels, if the maximum value of distribution factors to unprocessed pixels located forward in the direction in which the error diffusion processing progresses is represented as D (where D is a real number in the range of 0<D<1), the number of pixels in the overlapped region may be set equal to or more than a value obtained by adding one to the minimum value of N at which D to the Nth power (where N is a positive integer) becomes equal to or less than one the number of gray levels capable of being represented by the image data before the binarization process.

According to the above invention, the overlapped region includes more than the number of pixels necessary to absorb the influence of the error caused by binarizing the processed pixel. Therefore, even when the error diffusion processing starts from the first pixel of the overlapped region, the same binary image data when the error diffusion processing starts from the beginning of the line before divided can be obtained on the downstream side of the overlapped region in the direction in which the processing progresses.

In the third aspect of the present invention, there is provided an image processing apparatus for binarizing multi-tone image data using error diffusion, the image processing apparatus comprising: image data dividing means (31) for dividing one line of multi-tone image data into two or more segments of image data with an overlapped region of the two or more segments of image data provided across the boundary; two or more density data buffers (32, 33) each of which is provided for each segment of image data divided by the image data dividing means (31) so that each corresponding segment of image data will be stored in each of the density data buffers; two or more error data buffers (37, 39) each of which is provided for each of the density data buffers (32, 33) so that error data indicating the magnitude of an error between the density of an original pixel being binarized and the density of the pixel after the binarization process will be stored in each of the error data buffers; two or more error-diffusion executing means (36, 38) each of which is provided for each of the density data buffers (32, 33) and performs error diffusion processing on each segment of image data stored in each corresponding density data buffer (32 or 33) to output binary image data in such a manner that the two or more error-diffusion executing means (36, 38) will progress their error diffusion processing in parallel in the same direction along the line before divided; and image data merging means (40) for merging two or more segments of binary data outputted from the two or more error-diffusion executing means (36, 38) by using, as binary image data corresponding to the overlapped region, binary image data obtained from the divided image data located upstream of the line before divided in the direction in which the error diffusion processing progresses, to create binary image data corresponding to one line of image data before divided.

According to the above invention, since the image processing apparatus has the density data buffers (32, 33) and the error data buffers (37, 39) for the respective segments of image data, the error diffusion processing can be performed on the respective segments of image data in parallel without the need to arbitrate memory access competition. It also eliminates waiting time due to memory access competition and hence speeds up the processing.

In this aspect of the present invention, one line of multi-tone image data may be divided into two or more segments of image data having the same number of pixels.

According to the above invention, time required to perform the error diffusion processing on segment of image data becomes equal to that of the other, so that parallel processing can be performed without wasting time, thereby reducing the total processing time.

In the fourth aspect of the present invention, there is provided an image processing method for scanning an original line by line and performing image processing on the scanned image data, the image processing method comprising: a scanning step of scanning the original line by line; a dividing step of dividing one line of image data scanned in the scanning step into two or more segments of image data; an image processing step of performing image processing on the two or more segments of image data divided in the dividing step; and an image merging step of merging the two or more segments of image data subjected to image processing in the image processing step into the same layout as the original, wherein image processing is performed on the two or more segments of image data in parallel in the image processing step.

In the fifth aspect of the present invention, there is provided an image processing method for binarizing multi-tone image data using error diffusion, the image processing method comprising the steps of: dividing one line of multi-tone image data into two or more segments of image data with an overlapped region of the two or more segments of image data provided across the boundary; performing error diffusion processing on the respective segments of image data in parallel in the same direction along the line before divided to acquire binary data obtained by binarizing each segment of image data; and merging the two or more segments of binary data by using, as binary image data corresponding to the overlapped region, binary image data obtained from the divided image data located upstream of the line before divided in the direction in which the error diffusion processing progresses, to create binary image data corresponding to one line of image data before divided.

In the other aspect of the present invention, there is provided an image processing method for binarizing multi-tone image data using error diffusion, in which when a partial area of an image is subjected to error diffusion, the error diffusion processing starts at a position located a predetermined distance before reaching the partial area in the direction in which the error diffusion processing progresses.

According to the above invention, since the error diffusion processing starts at a position located a predetermined distance before reaching the partial area in the direction in which the error diffusion processing progresses, so that even when the image is trimmed to leave only the partial area, the same binary image data when the error diffusion processing is performed on the entire image can be obtained, thus improving image quality around the edges of the partial area. In this case, the predetermined distance before reaching the partial area includes a distance before reaching the partial area along either the landscape or portrait of the image, or both.

DETAILED DESCRIPTION OF THE PREFERRED EMBODIMENTS

The invention will now be described by reference to the accompanying drawings showing embodiments.

Figure 2:
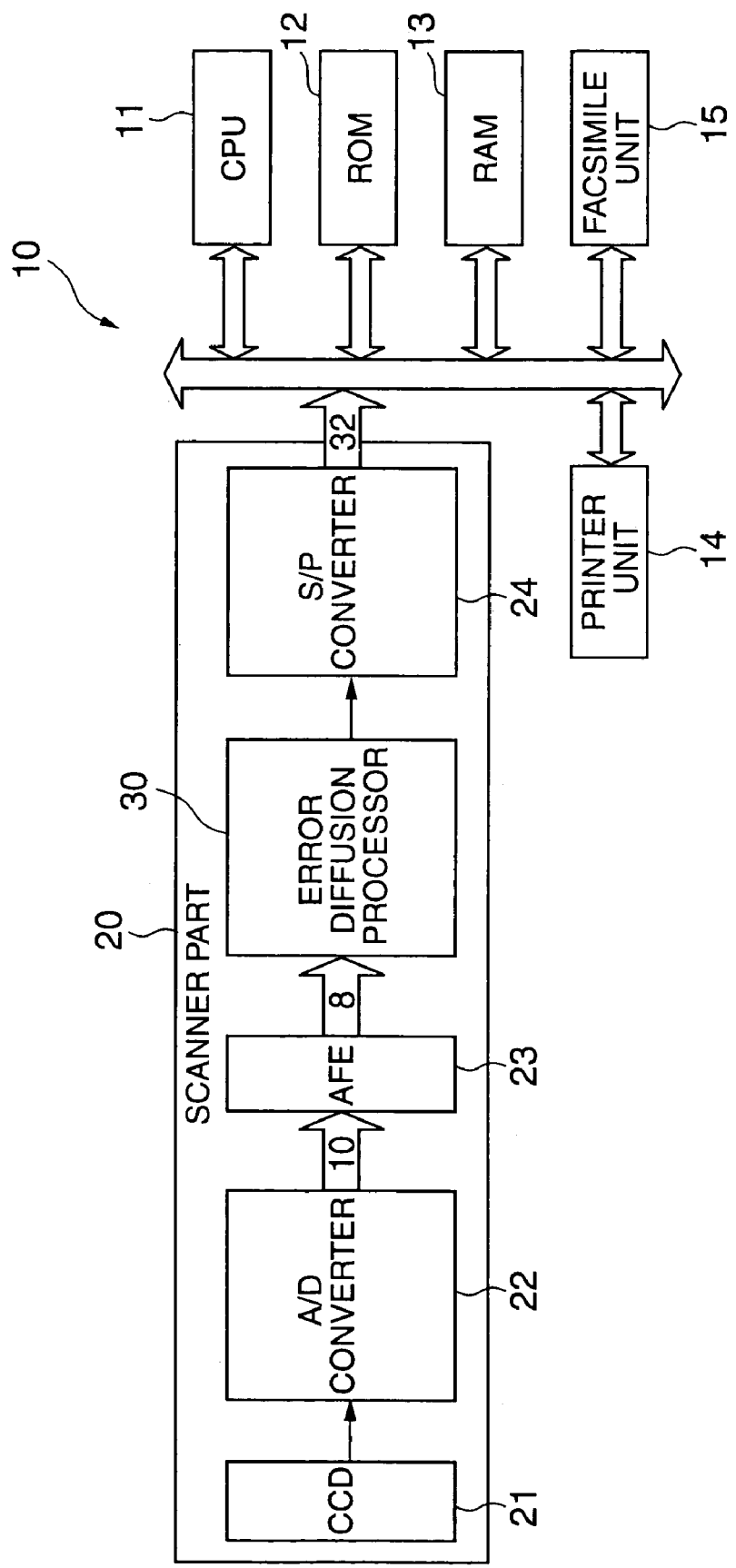
FIG. 2 is a block diagram showing the schematic structure of the image processing apparatus according to the embodiment of the present invention.

FIG. 2 is a block diagram showing the schematic structure of an image processing apparatus 10 according to the present invention. This apparatus is a so-called multifunction device that provides all-in-one functions as a scanner for scanning original images, a copier for scanning original images, copying the scanned images, and printing out them on paper, a facsimile machine for exchanging image data with remote machines, and a printer for printing out data based on print data inputted from a personal computer or the like.

The image processing apparatus 10 has a CPU (Central Processing Unit) 11, connected with various other units through a bus, for controlling the operation of the entire apparatus. Of all the units, a ROM (Read Only Memory) 12 is a read-only memory that is programmed to prestore a program describing how the CPU 11 operates and various kinds of fixed data. A RAM (Random Access Memory) 13 not only temporarily stores various kinds of data necessary for the CPU 11 to execute a program, but also functions as a page memory for storing one page of binary image data.

A scanner unit 20 carries out a function for scanning images on an original placed on a platen glass, not shown, or fed by an automatic document feeder, not shown, and outputting corresponding image data. A printer unit 14 carries out a function for printing out images corresponding to the image data on paper. In this case, the printer unit 14 takes the form of a laser printer using an electrophotographic process. A facsimile unit 15 functions as a facsimile machine for exchanging image data with other remote machines through a communication line.

The scanner unit 20 includes a CCD 21 as a line image sensor capable of scanning one line of image data along the width of the original (in the main scanning direction). After scanning the line, the CCD 21 is moved along the length of the original (in the sub-scanning direction) to scan all over the page of the original. The CCD 21 receives reflected light from the original and outputs an analog electrical signal corresponding to the intensity of the light. An A/D converter 22 converts the analog electrical signal to a digital electrical signal that is 10 bits deep, and an AFE (Analog Front End) 23 performs correction processing such as shading correction to convert the digital electrical signal to a digital signal of 8 bits that correspond to the depth of each pixel and represent the density of each pixel in 256 levels of gray.

An error diffusion processor 30 performs error diffusion to convert the multi-tone image data (digital electrical signal) outputted from the AFE 23 to binary image data with a depth of one bit in which each pixel represents either black or white. The error diffusion processor 30 also has such an image-enlarging function as to perform enlarging processing and error diffusion processing one line after another in step with the scanning speed of the CCD 21 for a shorter time than the scanning cycle of the CCD 21 from the time when the CCD 21 starts scanning of a line before the CCD 21 starts scanning of the next line.

The binary image data serially outputted from the error diffusion processor 30 according to the progress of the error diffusion processing is then converted by an S/P converter 24 to a parallel signal corresponding to the bus width, and outputted to the bus. The binary data outputted from the scanner part 20 is stored in the page memory, and after subjected to rotation processing as necessary at a rotation processor, not shown, the binary data is either stored in a magnetic disk drive, not shown, or used in the printer unit 14 or facsimile unit 15.

Figure 3:
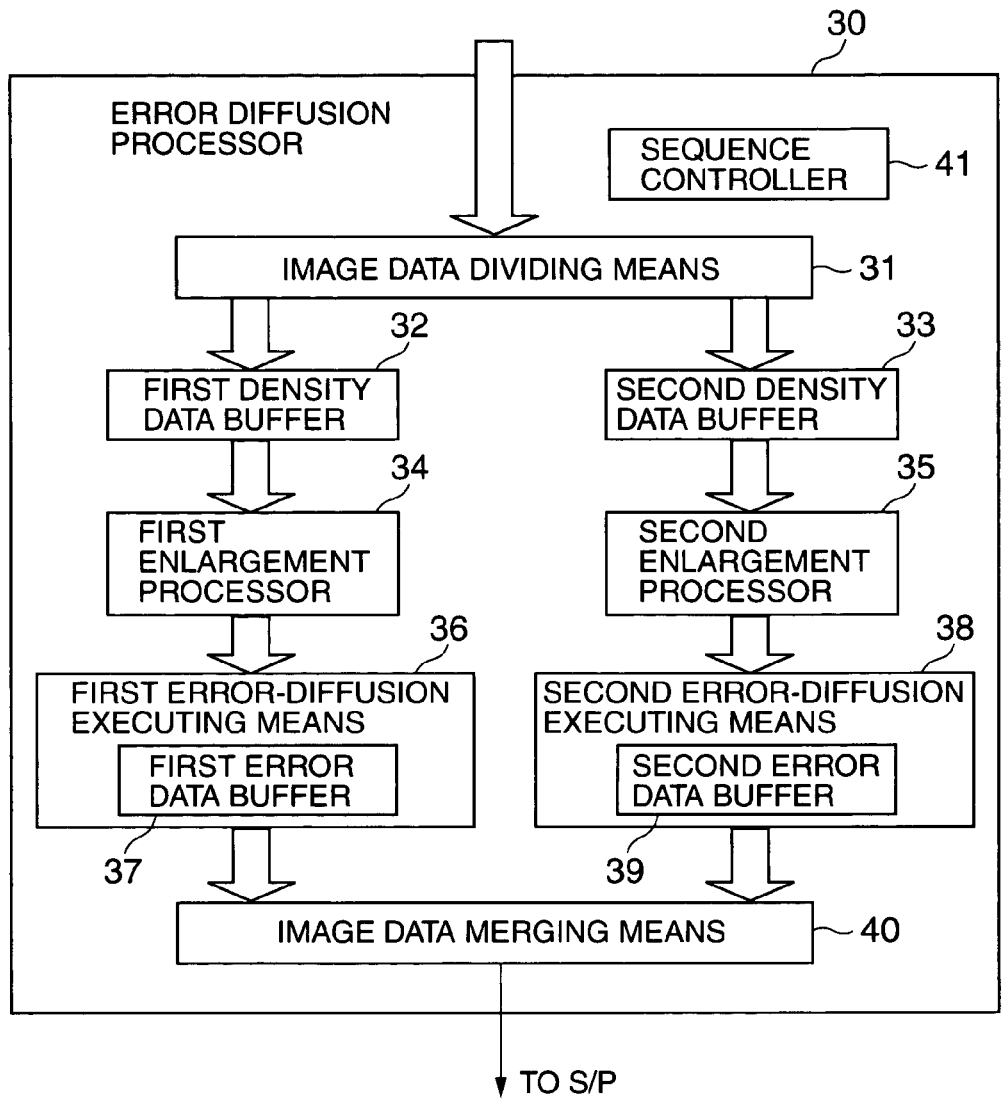
FIG. 3 is a block diagram showing an error diffusion processor provided in the image processing apparatus according to the embodiment of the present invention.

FIG. 3 shows the internal structure of the error diffusion processor 30. A sequence controller 41 controls the operation of each part of the error diffusion processor 30. Image data dividing means 31 carries out a function for dividing the multi-tone image data of one line sequentially inputted from the AFE 23 into two segments of image data with an overlapped portion provided at some midpoint in the line. A first density data buffer 32 is a memory for storing one segment of image data on the front side of the line, and a second density data buffer 33 is a memory for storing the other segment of image data on the rear side of the line.

For example, pixels from the first pixel to a $+100^{th}$ pixel from the central pixel of one line are stored in the first density data buffer 32 as the first segment of image data, and pixels from a $-100^{th}$ pixel from the central pixel of the line to the last pixel of the line are stored in the second density data buffer 33 as the second segment of image data. Thus the image data of one line is divided into the two segments of image data with an overlapped region of 200 pixels provided across the boundary. The image data dividing means 31 controls the image data sequentially inputted from the AFE 23 by outputting a write signal for the image data only to the first density data buffer 32, both to the first and second density data buffers 32 and 33, or only to the second density data buffer 33, thus performing the above-mentioned dividing process.

A first enlargement processor 34 carries out a function for enlarging the first segment of image data stored in the first density data buffer 32, and a second enlargement processor 35 carries out a function for enlarging the second segment of image data stored in the second density data buffer 33. For example, assuming that the image data is scaled up 1.5 times in the main scanning direction, one pixel is inserted between two pixels in the image data before scaled up. The density of the pixel inserted is assigned the average value of the densities of the pixels straddling the pixel inserted.

Figure 4:
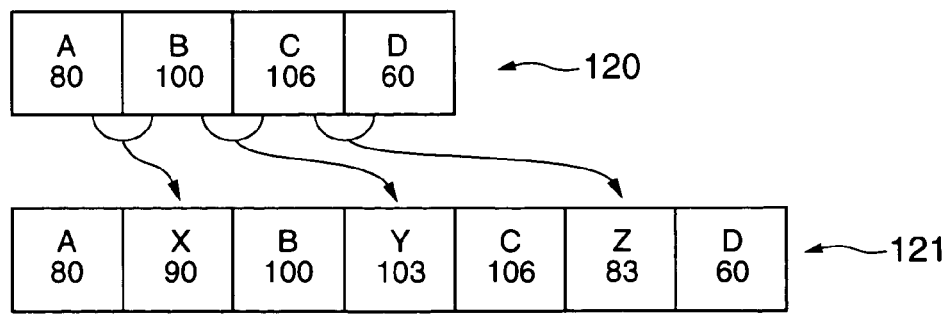
FIG. 4 is an illustration explaining the contents of processing for scaling up image data 1.5 times.

FIG. 4 shows an example of an image data 120 before scaled up and an image 121 after scaled up 1.5 times. As shown, pixel X with an average density of "90" is generated and inserted between pixel A with a density of "80" and pixel B with a density of "100." Similarly, pixel Y with an average density of "103" is generated and inserted between the pixel B with the density of "100" and pixel C with a density of "106," and pixel Z with an average density of "83" is generated and inserted between the pixel C with the density of "106" and pixel D with a density of "60."

The first enlargement processor 34 reads out the first segment of image data stored in the density data buffer 32 in order from the top while inserting the above-mentioned pixel in real time, thus outputting the image data after scaled up sequentially to first error-diffusion executing means 36. On the other hand, the second enlargement processor 35 processes the second segment of image data stored in the second density data buffer 33 in the same manner as the first enlargement processor 34 does, thus outputting the processed image data sequentially to second error-diffusion executing means 38.

The first error-diffusion executing means 36 carries out a function for performing error diffusion to binarize the multi-tone image data inputted from the first enlargement processor 34. The second error-diffusion executing means 38 carries out a function for performing error diffusion to binarize the multi-tone image data inputted from the second enlargement processor 35.

Figure 5:
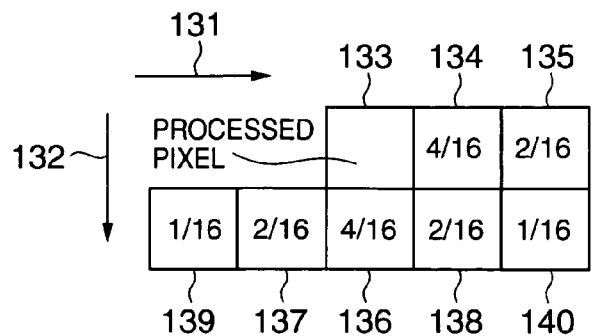
FIG. 5 is an illustration showing an example of distribution factors used in error diffusion processing for distributing an error in a pixel being processed to seven neighboring pixels.
Figure 17:
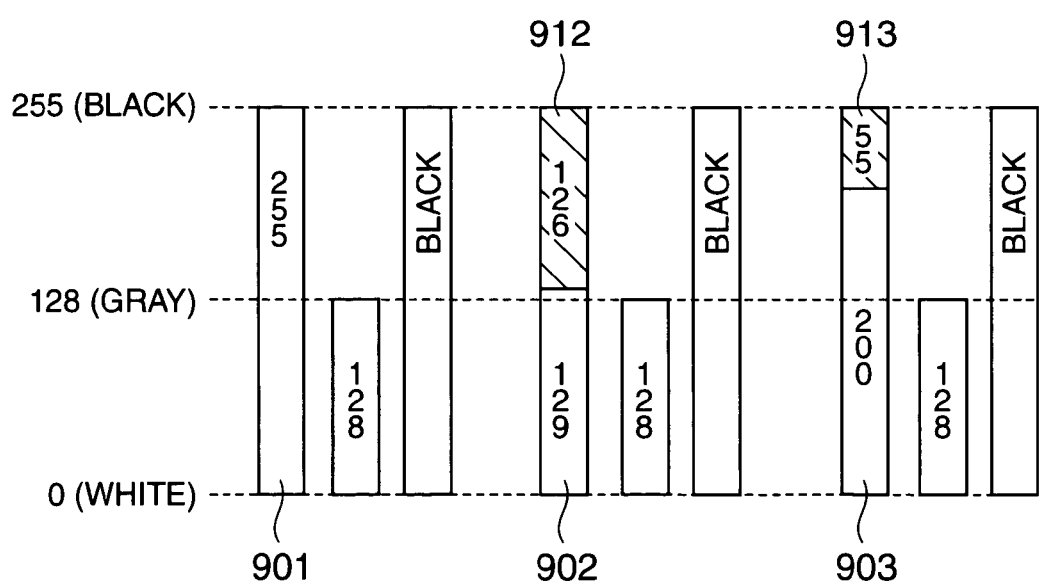
FIG. 17 is an illustration showing a state where when multi-tone pixels are binarized, an error is produced by a difference between the density of each pixel before the binarization process and the density of the pixel after the binarization process.

When a halftone pixel is binarized to represent either black or white as shown in FIG. 17, a density error is produced by a difference between the density of the pixel before the binarization process and the density of the pixel after the binarization process. Therefore, in this error diffusion processing, the error is distributed to neighboring, unprocessed pixels. FIG. 5 shows an example of distribution factors when an error caused by binarizing the pixel being processed is distributed to seven neighboring, unprocessed pixels. The error diffusion processing advances in the main scanning direction indicated by arrow 131 within one line, or in the sub-scanning direction indicated by arrow 132 between lines. In this example, four-sixteenth of an error caused by binarizing pixel 133 being processed is distributed to the following pixel 134 that is processed next, and two-sixteenth of the error is then distributed to pixel 135 that follows the pixel 134. For distribution to the following line that is processed next in the sub-scanning direction, four-sixteenth of the error is distributed to pixel 136 immediately underneath the pixel 133, two-sixteenth of the error is distributed to pixels 137 and 138 straddling the pixel 136, and one-sixteenth of the error is distributed to pixels 139 and 140 placed before and behind the pixels 137 and 138, respectively.

Figure 6:
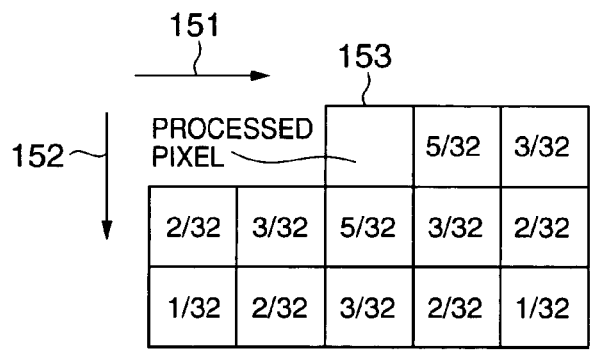
FIG. 6 is an illustration showing an example of distribution factors used in error diffusion processing for distributing an error in a pixel being processed to twelve neighboring pixels.

FIG. 6 shows an example of distribution factors when an error caused by binarizing the pixel being processed is distributed to twelve neighboring, unprocessed pixels. In FIG. 6, arrow 151 indicates the direction of progress of the error diffusion processing in the main scanning direction, and arrow 152 indicates the direction of progress of the error diffusion processing in the sub-scanning direction. The error caused by binarizing pixel 153 being processed is distributed to respective pixels at respective ratios indicated in each pixel. The ratio or distribution factor is set lower as distance from the processed pixel 133 or 135 becomes larger.

The first error-diffusion executing means 36 has a first error data buffer 37 for storing error data indicating the magnitude of an error caused by binarizing each pixel. In other words, one-line of error data indicating the magnitude of the error caused by binarizing each pixel is registered in the first error data buffer 37 in order from the first pixel of the line. Similarly, the second error-diffusion executing means 38 has a second error data buffer 39.

Figure 7:
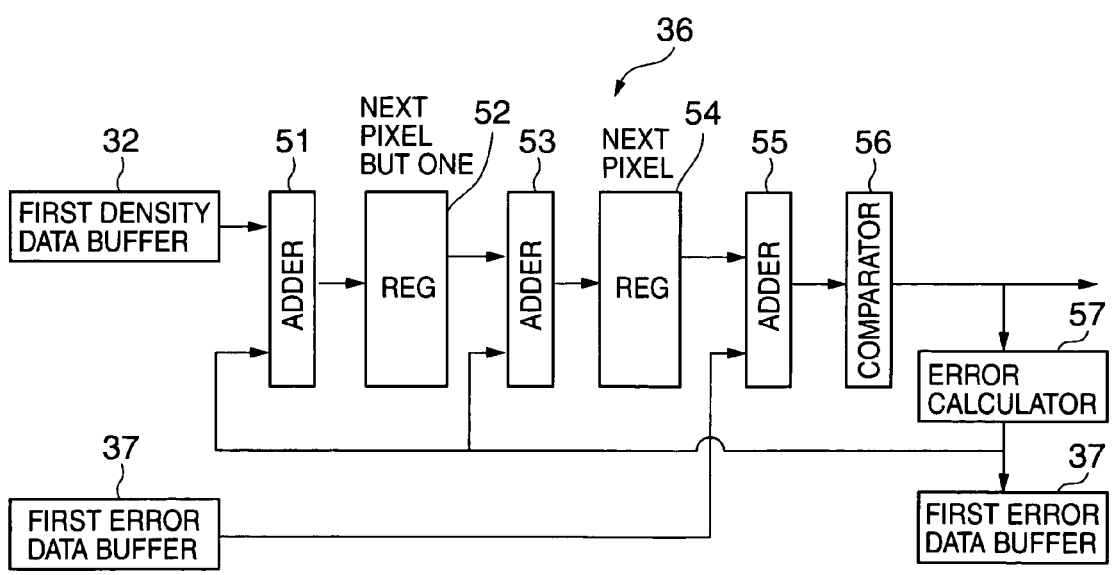
FIG. 7 is a block diagram showing the circuit structure of the error-diffusion executing means.

FIG. 7 shows the structure of the first error-diffusion executing means 36 when distributing an error in the manner as shown in FIG. 5. The first error-diffusion executing means 36 is made up of a first adder 51, a next-pixel-but-one register 52, a second adder 53, a next pixel register 54, a third adder 55, a comparator 56, an error calculator 57, and the first error data buffer 37.

In operation, two-sixteenth of an error caused by the comparator 56 binarizing two pixels before the pixel inputted from the first density data buffer 32 is added and distributed by the first adder 51 to the density of the pixel of interest. Then, four-sixteenth of an error caused by binarizing the immediately preceding pixel is added and distributed by the second adder 53 to the density of the pixel of interest. Further, all errors caused by binarizing the pixels of the previous line are collected from the first error data buffer 37, added and distributed by the adder 55. The density of the pixel to which all the errors to be distributed from neighboring pixels have been added is compared with a threshold value by means of the comparator 56, and converted to binary density data.

The error calculator 57 carries out not only a function for determining the magnitude of an error caused by the binarization process and registering the error value in the first error data buffer 37, but also a function for passing over four-sixteenth of the determined error to the second adder 53 and two-sixteenth to the fist adder 51, respectively. All the errors are collected from the first error data buffer 37 according to the distribution factors shown in FIG. 5. In FIG. 5, the error occurring in the pixel 133 is distributed to the five pixels 136 to 140 of the next line, that is, the pixel 136 immediately underneath the pixel 133 and respective two pixels straddling the pixel 136 in the next line, but as viewed from a pixel to which part of an error will be distributed, the errors are collected from the five pixels of the previous line, that is, from the pixel immediately underneath the pixel of interest and respective two pixels straddling the pixel in the previous line. Consequently, the errors collected according to the distribution factors shown in FIG. 5 from the five pixels of the previous line, that is, from the pixel immediately underneath the pixel being processed and the respective two pixels straddling the pixel, are inputted from the first error data buffer 37 to the third adder 55 in which the error values are added to the output value from the next pixel register 54. The second error-diffusion executing means 38 has the same structure as the first error-diffusion executing means 36, and its explanation will be omitted.

An image merging means 40 in FIG. 3 carries out a function for merging binary image data outputted from the first error-diffusion executing means 36 with binary image data outputted from the second error-diffusion executing means 38 to output binary image data of one line. Although both the first error-diffusion executing means 36 and the second error-diffusion executing means 38 output binary image data corresponding to the overlapped region, binary image data acquired from a segment of image data located on the upstream side in the direction in which the error diffusion processing progresses along the line before divided is used as binary image data in the overlapped region. In other words, the binary image data outputted from the first error-diffusion executing means 36 and the binary image data outputted from the second error-diffusion executing means 38 are merged into binary image data of one line by using binary image data outputted from the first error data buffer 37 as the binary image data corresponding to the overlapped region.

Figure 1:
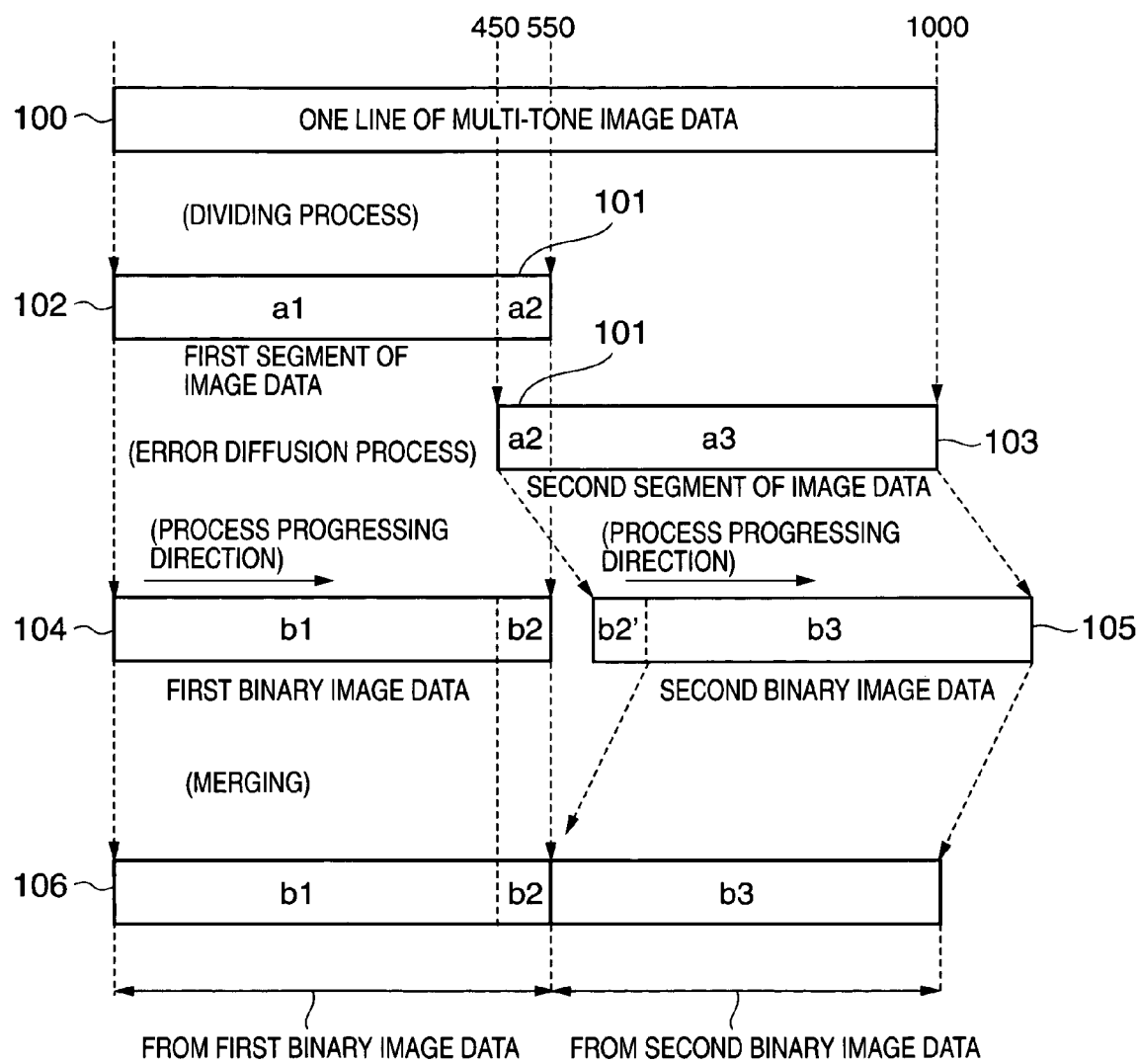
FIG. 1 is a diagram explaining the transition of image data when error-diffusion executing means of an image processing apparatus according to one preferred embodiment of the present invention performs error diffusion on one line of image data.

FIG. 1 shows an example of the transition of image data in the error diffusion processor 30. This example involves no enlargement processing. In this example, one line of multi-tone image data 100 is divided into a first segment of image data 102 and a second segment of image data 103 with a predetermined size of an overlapped region provided across the boundary between the first and second segments of image data. As shown in FIG. 1, this example assumes 1000 pixels in one line so that the image data of one line will be divided into the first segment of image data 102 (a1+a2) consisting of the first to $550^{th}$ pixels of the line and the second segment of image data 103 (a2+a3) consisting of the $451^{st}$ to $1000^{th}$ pixels with an overlapped region 101 (a2) of the $451^{st}$ to $550^{th}$ pixels.

The image data dividing means 31 stores the first segment of image data 102 in the first density data buffer 32 and the second segment of image data 103 in the second density data buffer 33. This kind of dividing process is performed for writing, into the first density data buffer 32 and/or the second density data buffer 33, the image data 100 of one line sequentially inputted from the first pixel of the line. In other words, when writing the first to $450^{th}$ pixels into the density data buffer, the image data dividing means 31 outputs a write signal only to the first density data buffer 32, while when writing the $551^{st}$ to $1000^{th}$ pixels, it outputs the write signal only to the second density data buffer 33.

The first error-diffusion executing means 36 performs error diffusion on the first segment of image data 102 stored in the first density data buffer 32 to output first binary image data 104 (b1+b2) corresponding to the first to 550$^{th}$ pixels in the line before divided. The second error-diffusion executing means 38 performs error diffusion on the second segment of image data 103 stored in the second density data buffer 33 to output second binary image data 105 (b2'+b3) corresponding to the 451$^{st}$ to 1000$^{th}$ pixels in the line before divided.

The image data merging means 40 merges the first binary image data 104 and the second binary image data 105 to create binary image data 106 corresponding to the image data of one line before divided. In merging the first and second binary image data, binary image data (b2) created based on the first segment of image data 102 located on the upstream side in the direction in which the error diffusion processing progresses is used as binary image data corresponding to the overlapped region 101. In other words, the first binary image data 104 (b1+b2) outputted from the first error-diffusion executing means 36 is used for the first to 550$^{th}$ pixels of the line, and second binary image data 105 (b3) outputted from the second error-diffusion executing means 38 is used for the 551$^{st}$ to 1000$^{th}$ pixels of the line. Then the first and second binary image data are merged and outputted as binary image data of one line.

Figure 8:
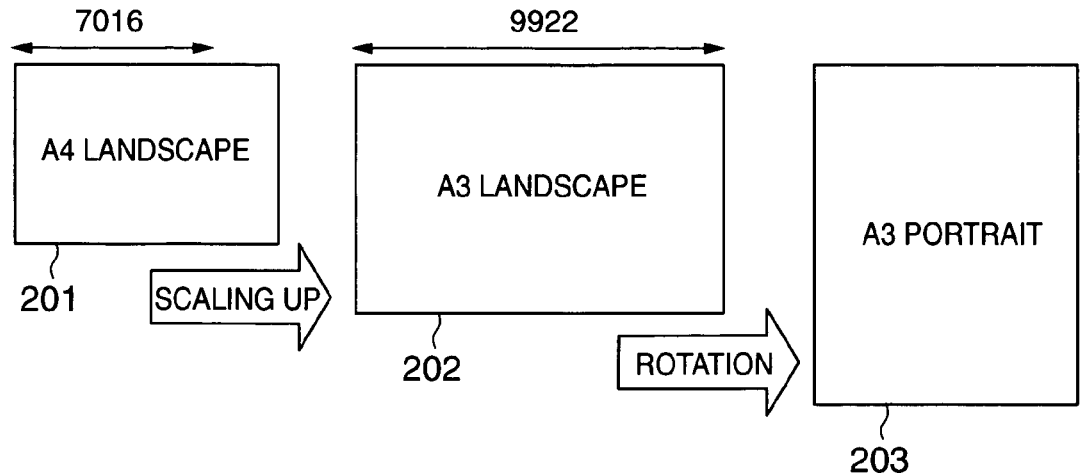
FIG. 8 is an illustration showing a flow of processing when an A4-landscape original is scanned at 600 dpi, and the scanned image is scaled up and rotated so that it will be recorded and printed all over A3-portrait recording paper at 600 dpi.
Figure 9:
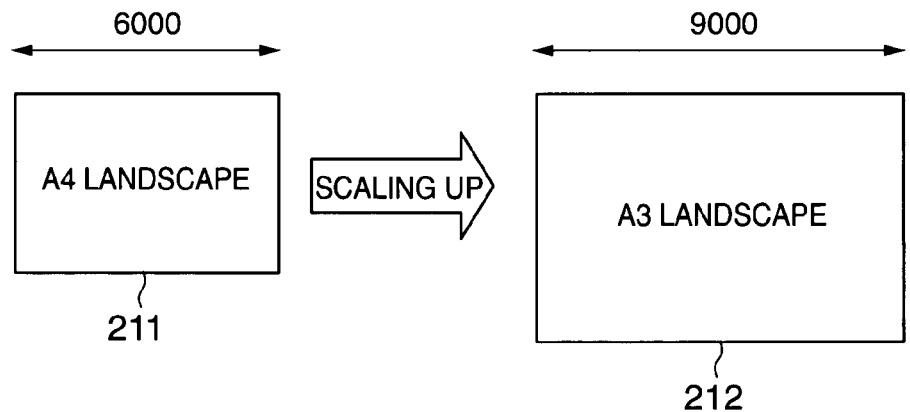
FIG. 9 is an illustration showing a simplified example of image data when the width of an A4-landscape image is 6000 pixels and the scaling factor to A3-landscape image is 1.5 times.

A description will next be made about a case where an A4-landscape original is scanned at a resolution of 600 dpi, and the scanned image is enlarged and rotated so that it will be recorded and printed all over A3-portrait recording paper. As shown in FIG. 8, the flow of operation is as follows: An A4-landscape original 201 is scanned at multiple levels of gray, and the scanned image is scaled up 1.41 times while being subjected to error diffusion to create an A3-landscape binary image 202. The image 202 is then rotated 90 degrees to create an A3-portrait binary image 203 so that the image 203 will be recorded and printed on A3-portrait recording paper. Since the length of the A4-landscape original in the main scanning direction is 297 mm that corresponds to 7016 pixels, scaling up 1.41 times means that it becomes 9922 pixels. However, as shown in FIG. 9, a description will be given, for the sake of convenience, of a case where one line of an A4-landscape original 211 is 6000 pixels, and is scaled up 1.5 times to an A3-landscape original image 212 of 9000 pixels in one line before subjected to error diffusion.

Figure 10:
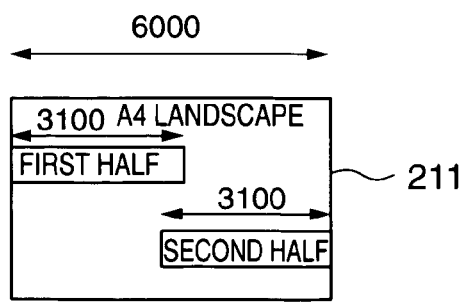
FIG. 10 is an illustration showing a case where the A4-landscape 6000 pixels are divided into first-half 3100 pixels and second-half 3100 pixels with an overlapped region of 200 pixels provided across the boundary.
Figure 11:
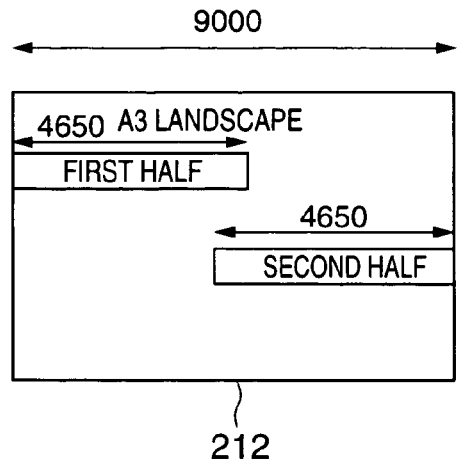
FIG. 11 is an illustration showing a case where the image shown in FIG. 10 is scaled up 1.5 times.

As shown in FIG. 10, the error diffusion processor 30 divides the A4-landscape original 211 before scaled up into the first half and the second half (two (right and left) halves) with an overlapped region provided across the boundary, and performs parallel processing on theses divided parts. In this case, the A4-landscape original 211 is divided into the first half including the first to 3100$^{th}$ pixels and the second half including the 2901$^{st}$ to 6000$^{th}$ pixels, with an overlapped region of the 2901$^{st}$ to 3100$^{th}$ pixels. The A4-landscape original 211 is scaled up 1.5 times to an A3-landscape original 212 as shown in FIG. 11. In other words, the first half includes 4650 pixels from the first to 4650$^{th}$ pixels of the line, the second half includes 4650 pixels from the 4351$^{st}$ to 9000$^{th}$ pixels, and the overlapped region corresponds to the 4351$^{st}$ to 4650$^{th}$ pixels. This image 212 after scaled up is subjected to error diffusion.

Figure 12:
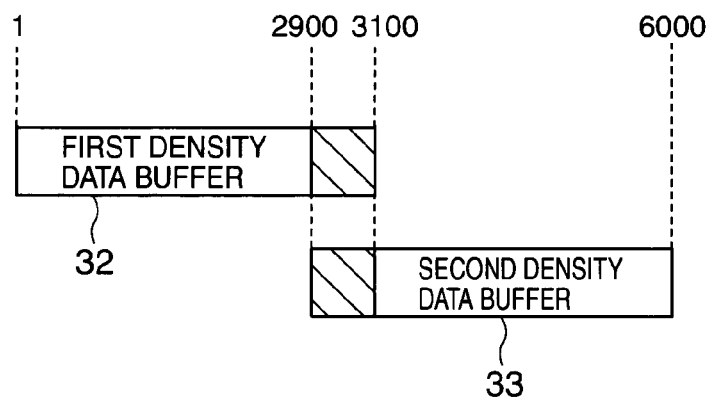
FIG. 12 is an illustration showing a case where the first-half 3100 pixels from the first to $3100^{th}$ pixels and the second-half 3100 pixels from the $2901^{st}$ to $6000^{th}$ pixels in one line of 6000 pixels are stored in a first density data buffer and a second density data buffer, respectively.

In the scanner part 20, the CCD 21 as a photoelectric device scans the original image, the A/D converter 22 converts an analog signal from the CCD 21 to a digital signal of 10 bits, the AFE 23 makes various corrections to convert the digital signal of 10 bits to image data (density data) of 8 bits that can represent each pixel as one of the 256 possible gray values. Then, as shown in FIG. 12, the image data dividing means 31 in the error diffusion processor 30 stores density data sequentially inputted from the AFE 23 in such a manner as to store the first to 2900$^{th}$ pixels of the line in only the first density data buffer 32, the 2901$^{st}$ to 3100$^{th}$ pixels in both the first density data buffer 32 and the second density data buffer 33, and the 3101$^{st}$ to 6000$^{th}$ pixels in only the second density data buffer 33.

The density data stored in the first density data buffer 32 (first segment of image data) is sent to the first enlargement processor 34 and scaled up 1.5 times. As shown in FIG. 4, the first enlargement processor 34 inserts one pixel between two pixels to create three pixels. The density of the pixel inserted takes an average value of the densities of the pixels straddling the pixel inserted. The second enlargement processor 35 performs the same processing on the density data (second segment of image data), and the first enlargement processor 34 and the second enlargement processor 35 operate in parallel with each other.

Figure 13:
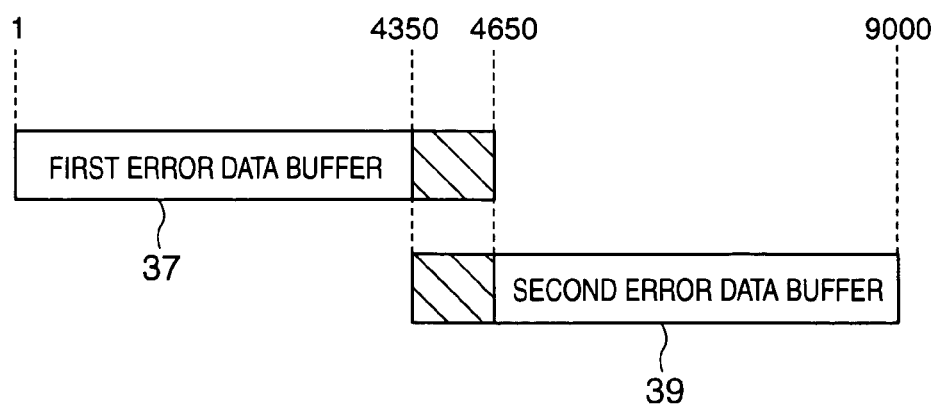
FIG. 13 is an illustration showing a case where image data obtained by scaling up the image data shown in FIG. 12 1.5 times is subjected to error diffusion.

Since the density data stored in the first and second density data buffers 32 and 33 are scaled up 1.5 times before subjected to error diffusion, error data of 4650 pixels are stored in both the first and second error data buffers 37 and 39, respectively, as shown in FIG. 13. In other words, error data from the first to 4650$^{th}$ pixels of the line are stored in the first error data buffer 37, and error data from the 4351$^{st}$ to 9000$^{th}$ pixels are stored in the second error data buffer 39. Then error data from the 4351$^{st}$ to 4650$^{th}$ pixels are stored in both the first error data buffer 37 and the second error data buffer 39.

The first error-diffusion executing means 36 and the second error-diffusion executing means 38 compare, with a threshold value, error data obtained by adding error data distributed from processed pixels to the density data of a processed pixel to binarize the processed pixel as either complete black or complete white. The error occurring in the binarized pixel is distributed to seven neighboring pixels as shown in FIG. 5. Two pixels out of the seven pixels, that is, the pixels 134 and 135 correspond to the next pixel and the next pixel but one in the same line in the direction in which the error diffusion processing progresses, so that respective error values are added to the density data stored in-the next-pixel-but-one register 52 and the next pixel register 54, respectively, according to the respective distribution factors. Since the remaining five pixels 136 to 140 are on the next line, the error values to be carried over to the next line are stored in the error data buffer 37 or 39.

As a result of the error diffusion processing, the first error-diffusion executing means 36 and the second error-diffusion executing means 38 output binary image data of 4650 pixels, respectively. The binary image data from the 4351$^{st}$ to 4650$^{th}$ pixels outputted from the first error-diffusion executing means 36 and the binary image data from the 4351$^{st}$ to 4650$^{th}$ pixels outputted from the second error-diffusion executing means 38 are obtained by performing error diffusion on the same density data. However, when binarizing the 4351$^{st}$ pixel data, the first error-diffusion executing means 36 compares, with the threshold value, a value obtained by adding error data distributed from previously processed pixels to the density data of the pixel of interest. On the other hand, the second error-diffusion executing means 38 binarizes the 4351$^{st}$ pixel data without distribution of any error value from the previously processed pixels because the pixel concerned is the first pixel for the second error-diffusion executing means 38.

For this reason, the binary data of the 4351$^{st}$ pixel outputted from the first error-diffusion executing means 36 and the binary data of the 4351$^{st}$ pixel outputted from the second error-diffusion executing means 38 may not be the same. As a result of the error diffusion processing for one line before divided, since the values outputted from the first error-diffusion executing means 36 are correct, the binary image data outputted from the first error-diffusion executing means 36 are used as binary data in the overlapped region.

On the other hand, in the region located downstream of the overlapped region, binary image data outputted from the second error-diffusion executing means 38 show the same results when image data of one line before divided is subjected to error diffusion in order from the first pixel. The reason is as follows. For example, suppose that one-fourth of an error caused by binarizing a processed pixel is distributed to the next pixel in the direction in which the error diffusion processing progresses. In this case, one-sixteenth of the error is distributed to the next pixel but one, and one sixty-fourth of the error is distributed to the next pixel but two. Thus the influence of the error decreases.

Figure 14:
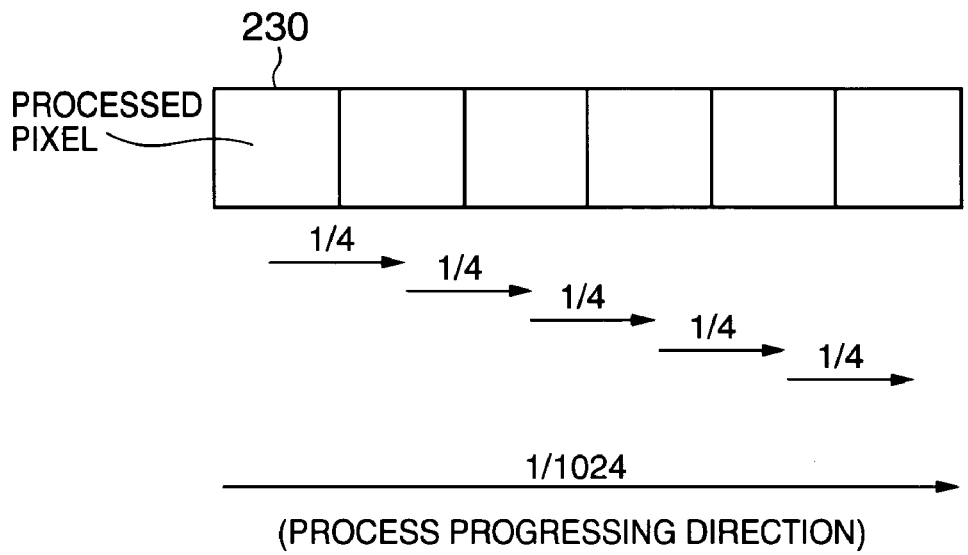
FIG. 14 is an illustration showing a state where the influence of an error occurring in a processed pixel on unprocessed pixels located forward in the direction in which the error diffusion processing progresses is gradually reduced.

When each pixel is represented by 8 bits with 256 different levels of gray, and one-fourth of an error is distributed to the next pixel in the direction in which the error diffusion processing progresses, the influence of an error occurring in processed pixel 230 becomes one-fourth (¼) of the error as shown in FIG. 14. Then the influence becomes $1/16$ of the error in the next pixel but one, $1/64$ in the next pixel but two, $1/256$ in the next pixel but three, and $1/1024$ in the fifth pixel from the processed pixel. Thus, when each pixel is represented by 8 bits with 256 different levels of gray, even if a possible maximum error occurs upon the binarization of the data, the error will never distributed to the fifth pixel from the processed pixel and further pixels that follow because of a bit-dropout.

Therefore, the length of the overlapped region is set longer than the region, within which the influence of the error disappears, so that even if the error diffusion processing starts from the top of the overlapped region, the same binary image data when the error diffusion processing starts from the top of the line before divided can be obtained in the region downstream of the overlapped region in the direction in which the error diffusion processing progresses.

The minimum size of the overlapped region within which the influence of the error ceases is determined as follows: If the maximum value of the distribution factors to unprocessed pixels located forward in the direction in which the error diffusion processing progresses is D (where D is a real number in the range of 0<D<1) (for example, four-sixteenth in FIG. 5), the minimum size of the overlapped region will be a value obtained by adding one to the minimum value of N at which D to the Nth power (where N is a positive integer) becomes equal to or less than one the number of gray levels capable of being represented by the image data before subjected to binarization.

Thus the same binary image data when the error diffusion processing starts from the top of the line before divided can be obtained in the region downstream of the overlapped region in the direction in which the error diffusion processing progresses. Therefore, the binary image data outputted from the first error-diffusion executing means 36 and the binary image data outputted from the second error-diffusion executing means 3 are merged using the output results from the first error-diffusion executing means 36 for binary data in the overlapped region, thereby obtaining one-line of binary data that fully matches the binary data obtained when the error diffusion processing is performed in order from the beginning to the end of the line without any break.

Figure 15:
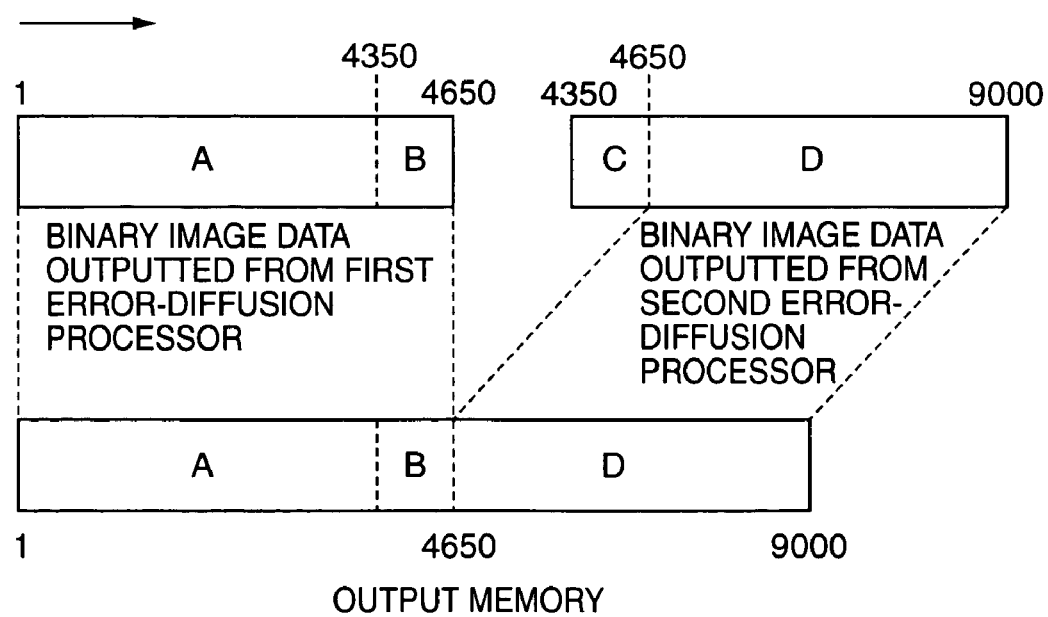
FIG. 15 is an illustration showing how to merge binary image data respectively outputted from first error-diffusion executing means and second error-diffusion executing means.

In other words, as shown in FIG. 15, binary image data (A+B) from the first to $4650^{th}$ pixels outputted from the first error-diffusion executing means 36 and binary image data (D) from the $4651^{st}$ to $9000^{th}$ pixels outputted from the second error-diffusion executing means 38 are merged to obtain binary image data (A+B+D) corresponding to one line before divided.

The S/P converter 24 then performs serial/parallel conversion of the binary image data merged as shown in FIG. 15 so that the converted data will match the bus width of the page memory, and sends the binary image data to a memory controller, not shown, to store the same in the page memory 13. After that, the binary image data is rotated 90 degrees in the page memory, and recorded on A3-portrait recording paper in the printer unit 14.

As discussed above, one line is divided into two or more segments, and the error diffusion processing is performed on the segments in parallel to output two or more segments of binary image data. Then the binary image data are merged to create binary image data corresponding to one line before divided. It can reduce processing time compared to a case where one line of binary image data is processed continuously from the beginning to the end of the line. Therefore, even when the number of pixels in one line increases because of the enlargement of the image, the error diffusion processing can be performed on each line in real time in step with the scanning cycle of the scanner. It eliminates the need for a high-capacity page memory for storing one page of density data, and hence reduces memory requirements. Further, since the error diffusion is performed in parallel with the scanning, processing after the error diffusion (such as image rotation and printing) can start immediately after completion of the error diffusion processing, thus reducing user's waiting time.

A description will next be made of a case where the trimming of an image is done.

Figure 16:
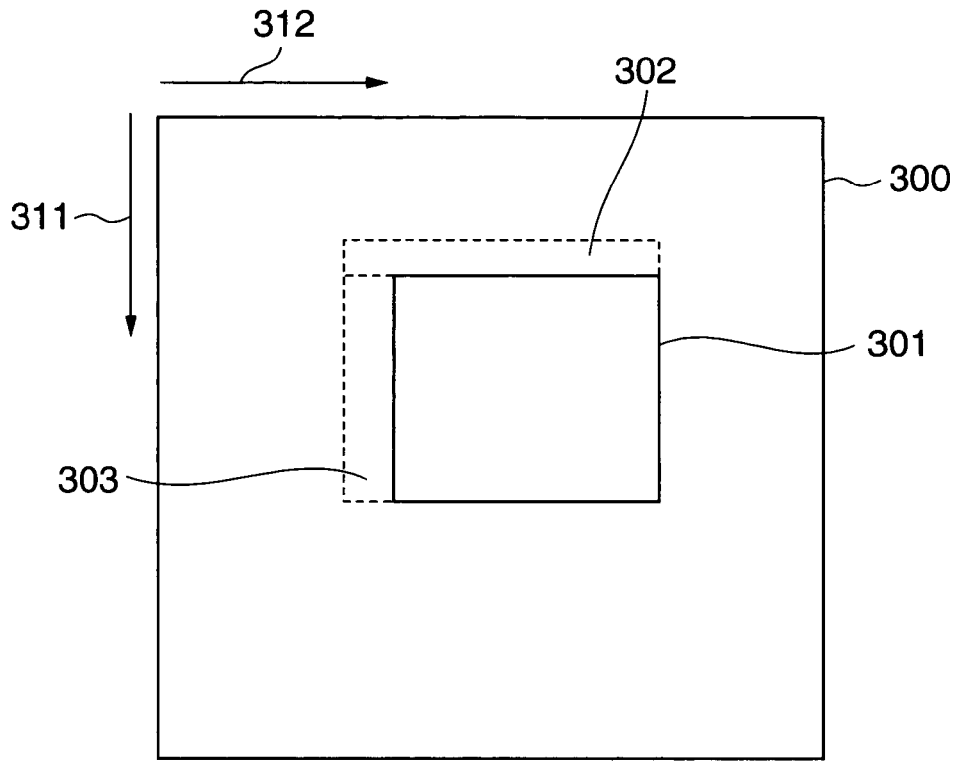
FIG. 16 is an illustration showing the relationship between a processed range and a partial area when the partial area is subjected to error diffusion according to a second embodiment of the present invention.

As shown in FIG. 16, suppose that an image is trimmed in such a manner as to leave only a partial area 301. In this case, if the error diffusion processing is performed on the partial area 301 alone, the partial area 301 is binarized without taking over any error from previous pixels, resulting in image degradation. On the other hand, if the trimming is done after performing the error diffusion processing on the entire image to obtain binary image data of the entire image, it will take long time to scan the original and perform the error diffusion on the scanned image.

To solve both problems, preliminary areas 302 and 303 that correspond to the above-described overlapped region are provided on the upstream side of the surrounding edges of the partial area 301 in the direction in which the error diffusion processing progresses so that the error diffusion processing will be performed on the area including these preliminary areas. In this case, only the binary image data corresponding to the partial area 301 is used. The preliminary area 302 is located upstream of (above) the partial area 301 in the direction in which the error diffusion processing progresses in the sub-scanning direction (in the direction of arrow 311); it is an area within which the influence of part of an error caused by binarizing image data of the first line in the preliminary area 302 and to be distributed in the sub-scanning direction is made to cease before reaching the partial area 301. The preliminary area 303 is located upstream of (on the left side of) the partial area 301 in the direction in which the error diffusion processing progresses in the main scanning direction (in the direction of arrow 312); it is an area within which the influence of part of an error caused by binarizing image data of the leftmost pixel in the preliminary area 303 and to be distributed in the main scanning direction is made to cease before reaching the partial area 301.

Thus, since the error diffusion processing starts at a position located a predetermined distance before reaching the partial area 301, error-diffused, binary image data can be obtained without any image degradation around the edges of the partial area 301.

Although a preferred embodiment of the invention has been described above in connection with the accompanying drawings, it is not intended to limit the invention to the specific structure disclosed, and any changes and additions within the scope of the invention are included in the invention. For example, in the embodiment, one line is divided into two segments on which error diffusion processing is performed, but it may be divided into three or more segments. Further, in the embodiment, the error diffusion processing is performed on multiple segments of image data in parallel, but it is not necessary to start these processing functions concurrently. In other words, since the original is scanned in order of input from the beginning to the end of one line, the error diffusion processing for each segment of image data has only to start in response to the input of the image data, respectively.

Further, in the embodiment, one line is divided into two or more segment of image data in such a manner to contain an equal number of pixels, but the way of diving one line is not limited to the equal-division method. In addition, the size of the overlapped region may not be the size disclosed in the embodiment as long as the overlapped region includes more than the number of pixels necessary to absorb the error.

Furthermore, in the embodiment, the multi-tone image data sequentially inputted are divided into two or more segments of image data so that each segment of image data will be stored in a separate density data buffer. However, one line of image data may be stored continuously in a single density data buffer so that when reading image data from the density data buffer, the error-diffusion executing means or the enlargement processor will control the start address and the end address in such a manner to create an overlapped region.

According the image processing apparatus and method of the present invention, one line of multi-tone image data is divided into two or more segments of image data with an overlapped region provided across the boundary. The respective segments of image data are subjected to error diffusion separately and merged to obtain binary image data corresponding to the original image data of one line. Upon merging the divided image data, binary image data acquired from the divided image data located on the upstream side of the line before divided in the direction in which the error diffusion processing progresses is used as binary image data in the overlapped region. Thus the same binary image data when the error diffusion processing is performed continuously on the image data of one line can be obtained. If the error diffusion processing is performed on the respective segments of image data in parallel, processing time per line can be reduced.

Further, in the case that the number of pixels in the overlapped region is set more than the number of pixels necessary to absorb the error caused by binarizing the first pixel, binary data that fully matches the binary data obtained when the error diffusion processing is performed in order from the beginning to the end of the line before divided can be obtained in the region downstream of the overlapped region in the direction in which the error diffusion processing progresses.

Furthermore, in the case that the density data buffer and the error data buffer are provided for each segment of image data, the error diffusion processing can be performed on the respective segments of image data in parallel without the need to arbitrate memory access competition. It also eliminates waiting time due to memory access competition and hence speeds up the processing.

Furthermore, in the case that one line of multi-tone image data is divided into two or more segments of image data having the same number of pixels, time required to perform the error diffusion processing on one segment of image data becomes equal to that of the other, so that parallel processing can be performed without wasting time, thereby reducing the total processing time.

Furthermore, when the error diffusion processing is performed on a partial area of an image, the error diffusion processing may start at a position located a predetermined distance before reaching the partial area in the direction in which the error diffusion processing progresses. In this case, even when the image is trimmed to leave only the partial area, the same binary image data when the error diffusion processing is performed on the entire image can be obtained, thus improving image quality around the edges of the partial area.

What is claimed is:

1. An image processing apparatus for binarizing multi-tone image data, comprising:
    image processing executing means for dividing one line of multi-tone image data into two or more segments of image data with an overlapped region of the two or more segments of image data provided across the boundary, performing image processing on the respective segments of image data in the same direction along the line before divided, and outputting binary image data subjected to the image processing; and
    image data merging means for merging two or more segments of binary image data outputted from said image processing executing means by using, as binary image data corresponding to the overlapped region, binary image data obtained from the divided image data located upstream of the line before divided in the direction in which the image processing progresses, to create binary image data corresponding to one line before divided.

2. The apparatus according to claim 1, wherein said image processing executing means performs the image processing on the two or more segments of image data in parallel.

3. The apparatus according to claim 1, wherein the image processing includes error diffusion.

4. The apparatus according to claim 3, wherein among other distribution factors by which an error between the density of a pixel being binarized and the density of the pixel after the binarization process is distributed to neighboring pixels, if the maximum value of distribution factors to unprocessed pixels located forward in the direction in which the error diffusion processing progresses is represented as D (where D is a real number in the range of 0<D<1), the number of pixels in the overlapped region is set equal to or more than a value obtained by adding one to the minimum value of N at which D to the Nth power (where N is a positive integer) becomes equal to or less than one the number of gray levels capable of being represented by the image data before the binarization process.

5. An image processing apparatus for binarizing multi-tone image data using error diffusion, comprising:
    image data dividing means for dividing one line of multi-tone image data into two or more segments of image data with an overlapped region of the two or more segments of image data provided across the boundary;
    two or more density data buffers each of which is provided for each segment of image data divided by said image data dividing means so that each corresponding segment of image data will be stored in each of the density data buffers;
    two or more error data buffers each of which is provided for each of said density data buffers so that error data indicating the magnitude of an error between the density of an original pixel being binarized and the density of the pixel after the binarization process will be stored in each of the error data buffers;

two or more error-diffusion executing means each of which is provided for each of said density data buffers and performs error diffusion processing on each segment of image data stored in each corresponding density data buffer to output binary image data in such a manner that the two or more error-diffusion executing means will progress their error diffusion processing in parallel in the same direction along the line before divided; and image data merging means for merging two or more segments of binary data outputted from said two or more error-diffusion executing means by using, as binary image data corresponding to the overlapped region, binary image data obtained from the divided image data located upstream of the line before divided in the direction in which the error diffusion processing progresses, to create binary image data corresponding to one line of image data before divided.

6. The apparatus according to claim 1 wherein one line of multi-tone image data is divided into two or more segments of image data having the same number of pixels.

7. The apparatus according to claim 5 wherein one line of multi-tone image data is divided into two or more segments of image data having the same number of pixels.

8. An image processing method for binarizing multi-tone image data using error diffusion, comprising steps of:
dividing one line of multi-tone image data into two or more segments of image data with an overlapped region of the two or more segments of image data provided across the boundary;

performing error diffusion processing on the respective segments of image data in parallel in the same direction along the line before divided to acquire binary data obtained by binarizing each segment of image data; and merging the two or more segments of binary data by using, as binary image data corresponding to the overlapped region, binary image data obtained from the divided image data located upstream of the line before divided in the direction in which the error diffusion processing progresses, to create binary image data corresponding to one line of image data before divided.

* * * * *